United States Patent
Cheng et al.

(10) Patent No.: US 9,731,231 B2
(45) Date of Patent: Aug. 15, 2017

(54) LAMINAR FLOW INTAKE CHANNELING DEVICE

(71) Applicant: Taiwan Semiconductor Manufacturing Company, Ltd., Hsin-Chu (TW)

(72) Inventors: Ya-Ling Cheng, Yilan (TW); Ching-Yu Chang, Yilang County (TW)

(73) Assignee: Taiwan Semiconductor Manufacturing Company, Ltd., Hsin-Chu (TW)

(*) Notice: Subject to any disclaimer, the term of this patent is extended or adjusted under 35 U.S.C. 154(b) by 741 days.

(21) Appl. No.: 13/788,130

(22) Filed: Mar. 7, 2013

(65) Prior Publication Data
US 2014/0251926 A1 Sep. 11, 2014

(51) Int. Cl.
*B01D 29/90* (2006.01)
*B01D 29/11* (2006.01)

(52) U.S. Cl.
CPC .......... *B01D 29/906* (2013.01); *B01D 29/114* (2013.01)

(58) Field of Classification Search
CPC ...... B01D 29/114; B01D 29/33; B01D 29/90; B01D 29/904; B01D 29/906; B01D 29/908; B01D 2201/313; B04C 9/00; B04C 2009/004; A61M 1/0056
See application file for complete search history.

(56) References Cited

U.S. PATENT DOCUMENTS

| | | | | |
|---|---|---|---|---|
| 1,439,721 A | * | 12/1922 | Zahm | B01D 35/18 210/183 |
| 2,432,475 A | * | 12/1947 | Griffith | B01D 27/02 210/167.02 |
| 4,455,227 A | * | 6/1984 | Harms, II | B01D 35/18 210/184 |
| 6,048,454 A | * | 4/2000 | Jenkins | B01D 36/001 210/172.1 |
| 7,572,367 B2 | | 8/2009 | Laverdiere et al. | |

FOREIGN PATENT DOCUMENTS

GB 790533 A * 2/1958 ........... B01D 29/235

OTHER PUBLICATIONS

Definition of tub, www.dictionary.com, Accessed Oct. 21, 2016, pp. 1-7.*

* cited by examiner

*Primary Examiner* — David C Mellon
(74) *Attorney, Agent, or Firm* — Slater Matsil, LLP

(57) ABSTRACT

A filtering unit is provided which may include a filter cap, a filter basin, a filter or membrane within the filter basin and an enclosed fluid intake channel, which may dispense fluid into the filter basin. The enclosed fluid intake channel may be coupled to the inlet port of the filtering unit and may slope in a downward manner to the bottom of the filter basin. The intake channel may have an open end at the bottom of the filter basin. The open end may be substantially parallel with the filter basin bottom and may dispense fluid into the filter basin. The fluid may flow from the intake channel and into the filter basin in a laminar manner. The fluid may fill the filter basin and flow from the filtering unit through an outlet port of the filtering unit.

20 Claims, 10 Drawing Sheets

LAMINAR FLOW INTAKE CHANNELING DEVICE

BACKGROUND

In a semiconductor manufacturing process, semiconductor chips may be manufactured having devices such as transistors, resistors, capacitors, inductors, and the like formed therein. The manufacture of semiconductor chips may involve many processing steps, which may include combinations of photolithography, ion implantation, doping, annealing, packaging, etc. Many types of fluids may be used in these processes including water, dielectrics, polymers, photoresists, chemical etchants, acids, etc. These fluids are filtered and passed to manufacturing equipment, which uses the fluids during the manufacture of semiconductors.

BRIEF DESCRIPTION OF THE DRAWINGS

For a more complete understanding of the present embodiments, and the advantages thereof, reference is now made to the following descriptions taken in conjunction with the accompanying drawings, in which.

DETAILED DESCRIPTION

Figure 1A:
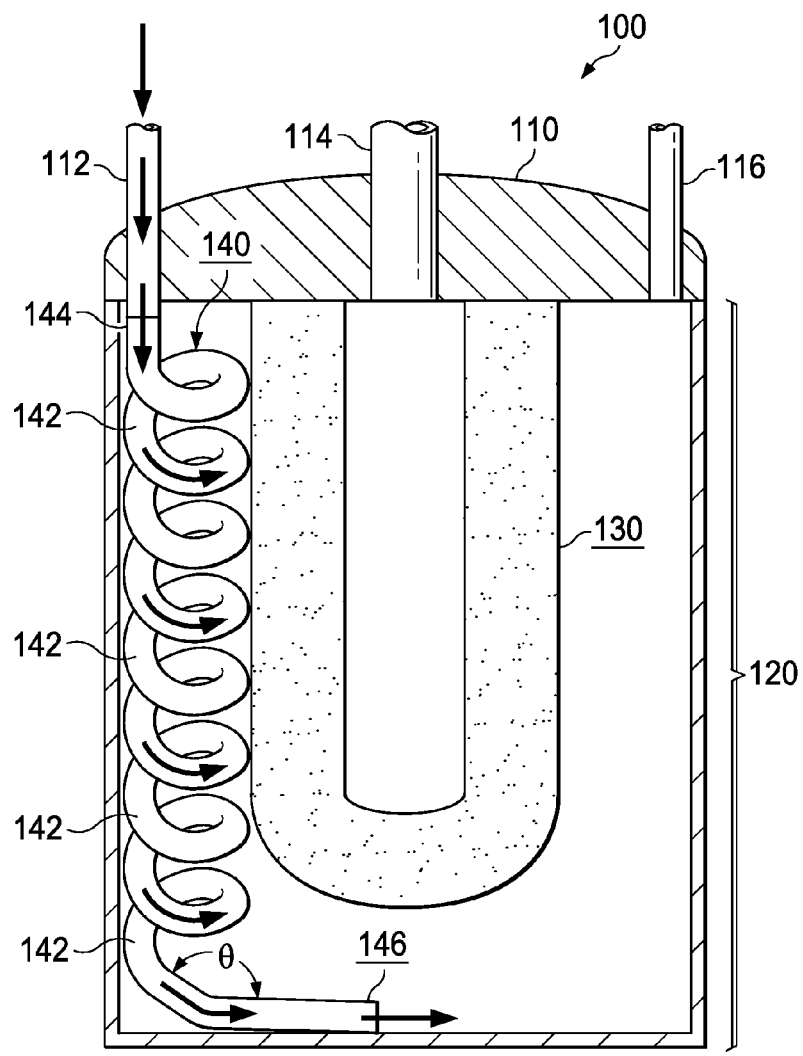
FIGS. 1A-1E illustrate cross-sectional views of a filtering unit according to an embodiment of the present disclosure.

The making and using of the embodiments of the present disclosure are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments. Throughout the various views and illustrative embodiments, like reference numbers are used to designate like elements.

A fluid such as, for example, photoresist, which is used in semiconductor manufacturing processes, is often filtered using one or more filtering processes to remove impurities from the fluid. In a filtering process, a fluid is poured or pumped into a filtering unit through a filter inlet port. The fluid drops to the bottom of the filtering unit and begins filling the filtering unit. The fluid flows or is forced through a filter or membrane within the filtering unit, which removes impurities from the fluid. After the fluid is filtered, it flows from the filtering unit through an outlet port.

Air or gasses may build-up in the filtering unit and may be vented from the filtering unit through a venting port. For example, when a fluid is poured into a filtering unit it typically drops to the bottom of the filtering unit and impacts the bottom of the filtering unit in a perpendicular manner. As the fluid impacts the bottom of the filtering unit, bubbles are formed and the fluid moves in a turbulent manner about the bottom of the filtering unit.

Additional fluid entering the filtering unit impacts, in a perpendicular manner, the existing fluid within the filtering unit and causes additional turbulence and bubbles to be formed in the fluid. The venting port provides a mechanism for the trapped air or gasses to escape the filtering unit.

Many bubbles, however, often do not escape the fluid and become trapped in the fluid and/or in the filter itself. The trapped bubbles impede the flow of fluid through the filter, which may reduce the overall efficiency and/or flow rate of fluid through the filtering unit. The bubbles can also degrade properties of the fluid itself. For example, excess bubbles within a photoresist can cause polymer aggregation within the photoresist that will degrade effectiveness of the photoresist during photolithography manufacturing processes.

According to embodiments of the present disclosure, a filtering unit may be provided, which may include an enclosed fluid intake channel that may slope from the inlet port towards the bottom of the filtering unit and dispense the fluid into the bottom of the filtering unit. The flow of the fluid dispensed from the intake channel may be substantially parallel with the bottom of the filtering unit. As described below for the embodiments of the present disclosure, the fluid dispensed into the filtering unit may flow along the bottom of the filter in an approximately laminar manner thereby reducing bubble formation in the fluid. The reduction of bubbles within the fluid may improve the flow rate and filtering efficiency for the filtering unit as well as reduce polymer aggregation of the fluid.

FIG. 1A illustrates a cross-sectional view of a filtering unit 100 according to an embodiment of the present disclosure. As illustrated in FIG. 1A, the filtering unit 100 may include a filter cap 110, a filter bowl or basin 120, a filter or membrane 130, and an enclosed fluid intake channel 140. The filter cap 110 may include an inlet port 112, an outlet port 114, and a vent port 116. The filter 130 may be held in place in the filter basin 120 using structural members (not shown) that may be present in the filter cap 110. The filtering unit 100 may be referred to as an enclosure.

The placement, shape, and/or location of the inlet port 112, the outlet port 114 and/or the vent port 116 on the filter cap 110 is provided for illustrative purposes only and is not meant to limit the scope of the present embodiments. Further, the shape of the filter cap 110 and the filter basin 120 as well as the placement and/or shape of the filter 130 is provided for illustrative purposes only and is not meant to limit the scope of the present embodiments. Flow arrows are provided in FIG. 1A to illustrate the flow of a fluid as it may flow into and within the filtering unit 100 and/or the intake channel 140. The fluid may be poured, pumped or injected into the inlet port 112.

As illustrated in FIG. 1A, the fluid intake channel 140 may have an enclosed body 142 between a first open end 144 and a second open end 146. The first open end 144 may be coupled to the inlet port 112 such that fluid entering the filtering unit 100 may flow directly into the intake channel 140. Thus, the first open end 144 may be sized to mate directly with the inlet port 112 to provide an unencumbered direct pathway for the fluid to enter the intake channel 140.

The second open end 146 may be open to the filter basin 120. The enclosed body 142 of the intake channel 140 may slope downward towards the bottom of the filter basin 120 between the first open end 144 and the second open end 146. Near the bottom of the filter basin 120, the enclosed body 142 of the intake channel 140 may gradually bend towards the second open end 146 such that the fluid may be dispensed from the second open end 146 of the intake channel 140 at a slight angle or substantially parallel relative to the bottom of the filter basin 120. In this manner, the flow of the fluid may be introduced into the filtering unit 100 in a more laminar manner thereby reducing bubble formation of the fluid as it fills the filter basin 120. In an embodiment, an outer portion of the second open end 146 of the intake channel 140 may be connected to the bottom of the filter basin 120 to provide support for the intake channel 140.

The intake channel 140, as illustrated in FIG. 1A, may be formed between a side of the filter basin 120 and the filter 130 and may slope to the bottom of the filter basin 120 in a spiral or helical manner. In other embodiments, discussed below in FIGS. 2-5, the flow path and/or shape of the intake channel 140 to the bottom of the filter basin 120 may be varied provided that the second open end 146 of the intake channel 140 may dispense fluid in a laminar manner at the bottom of the filter basin 120.

In various embodiments, the slope of the intake channel 140 may be greater than approximately 10° and less than 90°. FIG. 1A illustrates an angle θ that may be formed near the bottom of the filter basin 120 between the second open end 146 of the intake channel 140 and the enclosed body 142 as the intake channel may bend toward the second open end 246. In various embodiments, the angle θ may be greater than 90°, such as, for example, between approximately 110° and 180°. Increasing the angle θ may promote smooth fluid distribution from the intake channel 140 to the bottom of the filter basin 120.

Figure 1B:
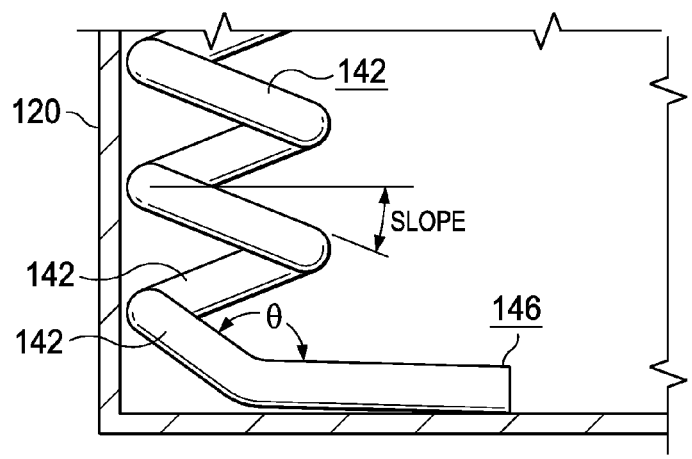

FIG. 1B illustrates a simplified cross-sectional view of the slope of the intake channel 140 as it may extend toward the bottom of the filter basin 120. As discussed above, the slope of the intake channel 140 may be greater than approximately 10° and less than 90°. Also illustrated in FIG. 1B is the angle θ that may be formed as the intake channel 140 may bend toward the second open end 146 at the bottom of the filter basin 120. The angle θ may be greater than the slope of the intake channel 140.

In various embodiments, the intake channel 140 may be formed of a plastic, a polymer, fiberglass, a metal, a carbon-based material, polyethylene ("PE"), ultra high molecular polyethylene ("UPE"), high density polyethylene ("HDPE"), polytetrafluoroethylene ("PTFE"), combinations thereof or the like. In various embodiments, the size of the opening at the first open end 144 may be larger than the size of the opening at the second open end 146. Thus, the enclosed body 142 of the intake channel 140 may taper from the first open end 144 to the second open end 146.

Figure 1C:
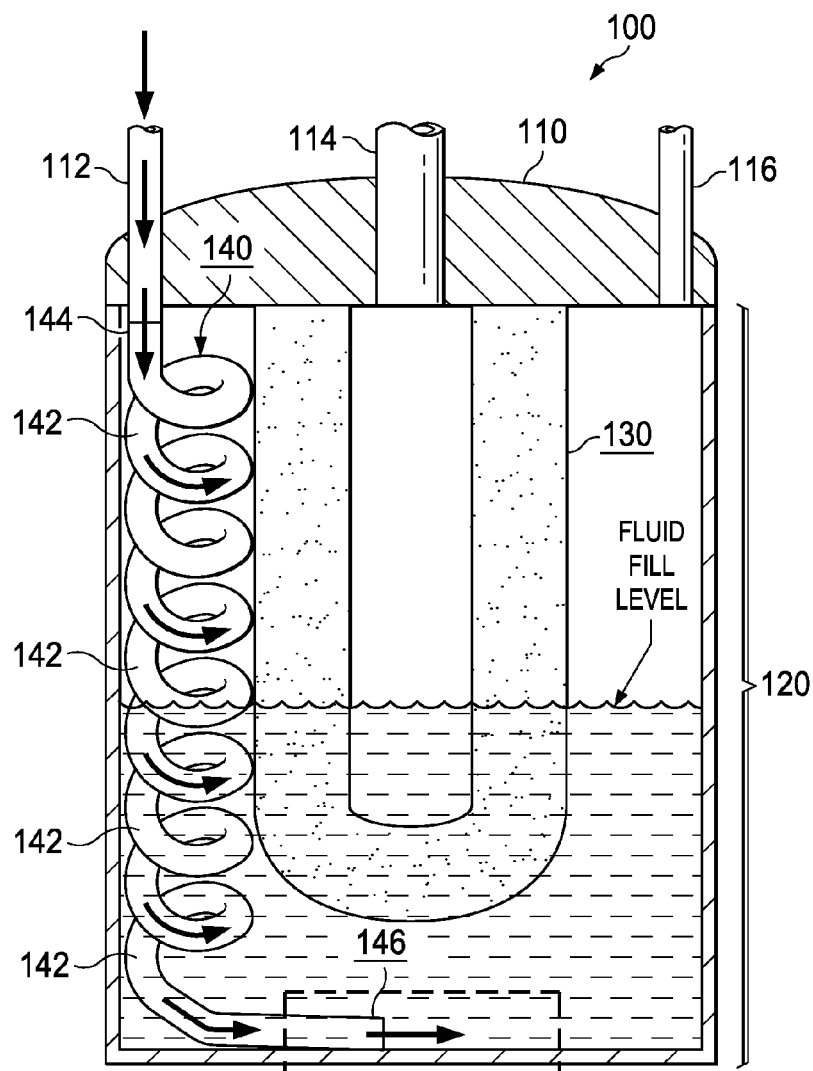
Figure 1D:
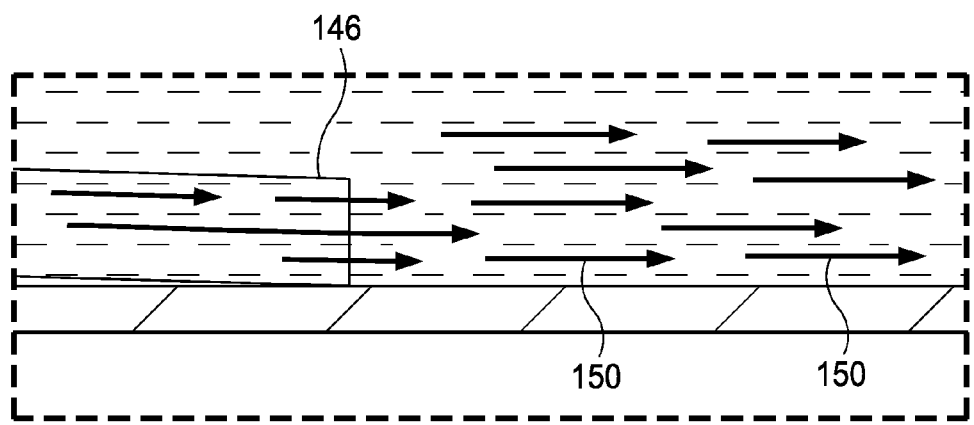
Figure 1E:
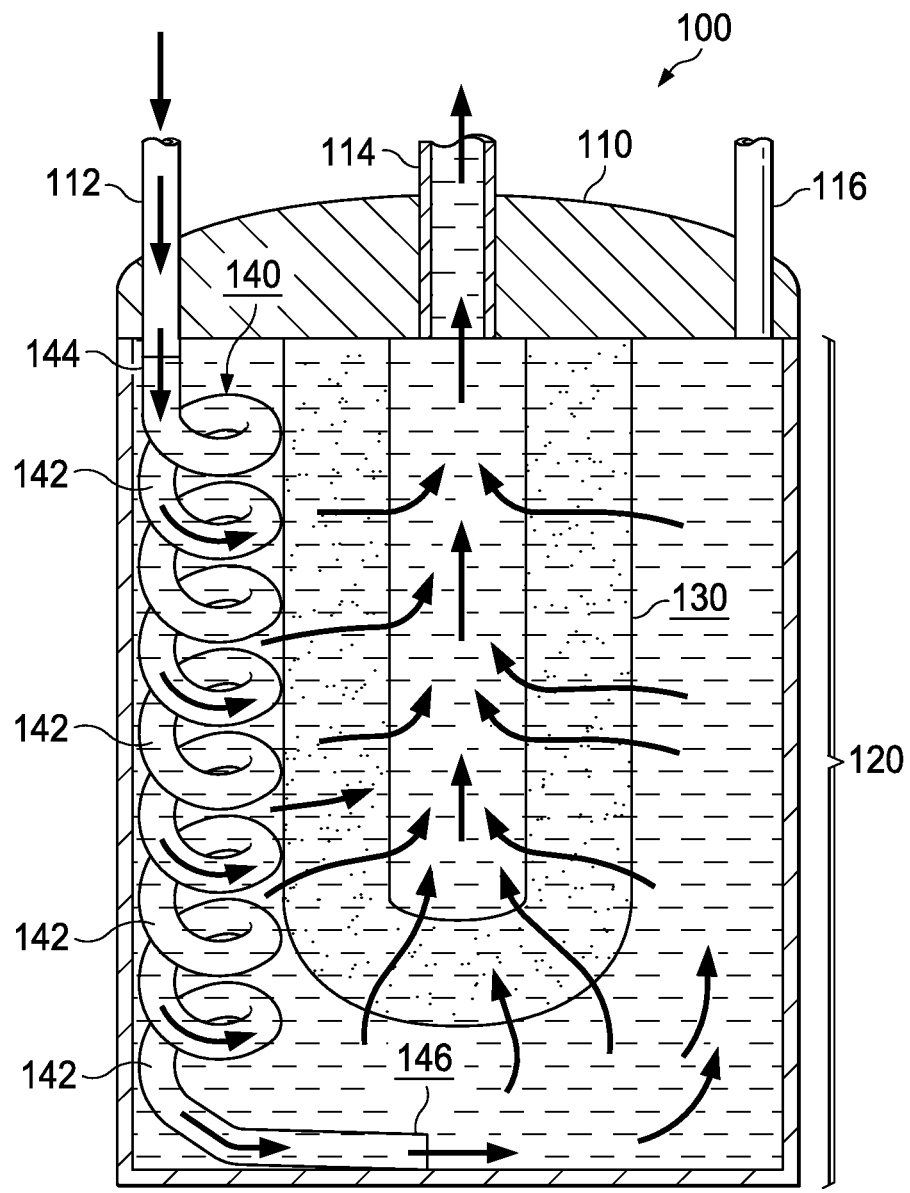

As illustrated in FIG. 1C, the fluid dispensed into the filter basin may begin to fill the basin. A fluid fill level is shown in FIG. 1C to represent a level to which the fluid has filled the filter basin 120. FIG. 1D provides an illustrative example of the laminar flow, represented by laminar flow lines 150, of the fluid as it may be dispensed into and may fill the filter basin 120. The laminar flow may aid in reducing bubble formation in the fluid as it exits the intake channel 140 enters and fills the filter basin 120. As illustrated in FIG. 1E, when the fluid may fill the filter basin 120, the fluid may flow through the filter 130 and exit the filtering unit 100 through the outlet port 114. Excess gas or air may vent from the filtering unit through the vent port 116. A baffle, valve or other mechanism (all not shown) may prevent the fluid from exiting the filtering unit 100 through the vent port 116.

As discussed above, the fluid flow path and/or shape of an intake channel may be varied provided that the end of an intake channel that may be open to a filter basin may dispense fluid in a laminar manner across the bottom of the filter basin. For illustrative purposes, FIGS. 2-6 show various intake channel configurations according to various embodiments that may be used to dispense fluid in a laminar manner across a bottom of a filter basin.

Figure 2:
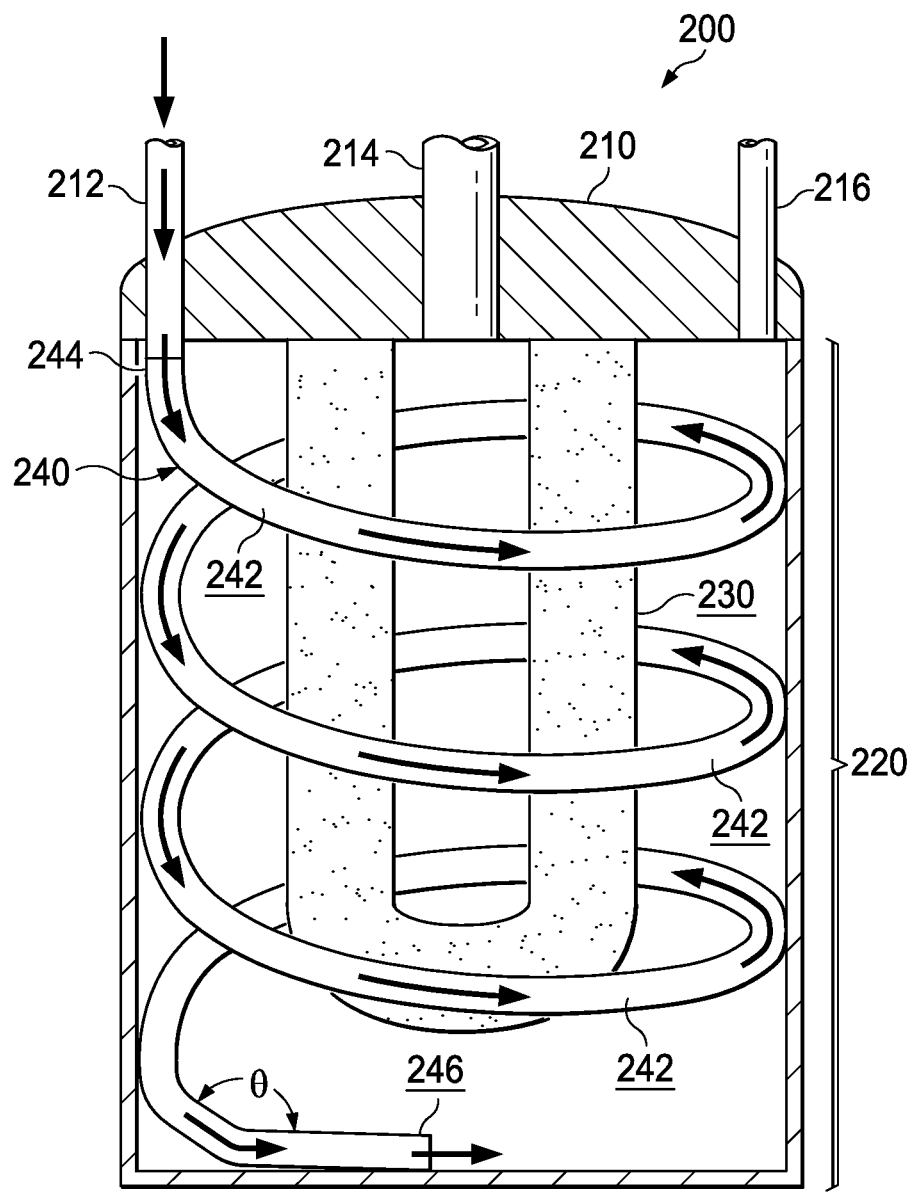
FIGS. 2-4 illustrate various cross-sectional views of other filtering units according to other embodiments.

FIG. 2 illustrates a cross-sectional view of another filtering unit 200 according to another embodiment of the present disclosure. As illustrated in FIG. 2, the filtering unit 200 may include a filter cap 210, a filter basin 220, a filter 230, and an enclosed fluid intake channel 240. The filter cap 210 may include an inlet port 212, an outlet port 214, and a vent port 216. The filter 230 may be held in place in the filter basin 220 using structural members (not shown) that may be present in the filter cap 210.

The placement, shape, and/or location of the inlet port 212, the outlet port 214 and/or the vent port 216 on the filter cap 210 is provided for illustrative purposes only and is not meant to limit the scope of the present embodiments. Further, the shape of the filter cap 210 and the filter basin 220 as well as the placement and/or shape of the filter 230 is provided for illustrative purposes only and is not meant to limit the scope of the present embodiments. Flow arrows are provided in FIG. 2 to illustrate the flow of a fluid as it may flow into and within the filtering unit 200 and/or the intake channel 240. The fluid may be poured, pumped or injected into the inlet port 212.

As illustrated in FIG. 2, the intake channel 240 may have an enclosed body 242 between a first open end 244 and a second open end 246. The first open end 244 may be coupled to the inlet port 212 such that fluid entering the filtering unit 200 may flow directly into the enclosed intake channel 240. Thus, the first open end 244 may be sized to mate with the inlet port 212 to provide an unencumbered direct pathway for the fluid to enter the intake channel 240.

In comparison to the intake channel 140 of FIG. 1, the enclosed body 242 of the intake channel 240 in FIG. 2 may be formed around a perimeter of the filter basin 220 and may encircle the filter 230 along the path of the intake channel 240 as it may slope to the bottom of the filter basin 220. The slope may be varied depending on the size and/or shape of the filter basin 220. It is understood that an overall length of the intake channel 240 from the first open end 244 to the second open end 246 may be increased or decreased to affect the slope of the intake channel 240. For example, the slope of the intake channel 240 may be decreased by increasing the length of the intake channel 240, thus forming more turns of the intake channel 240 around the perimeter of the filter basin 220. In another example, the slope of the intake channel 240 may be increased by decreasing the length of the intake channel 240, thus forming fewer turns of the intake channel 240 around the perimeter of the filter basin 220. Near the bottom of the filter basin 220, the enclosed body 242 of the intake channel 240 may gradually bend towards the second open end 246 such that the fluid may be dispensed from the second open end 246 of the intake channel 240 at a slight angle or substantially parallel to the bottom of the filter basin 220.

In various embodiments, the slope of the intake channel 240 may be greater than approximately 10° and less than 90°. FIG. 2 illustrates an angle θ that may be formed between the second open end 246 of the intake channel 240 and the enclosed body 242 near the bottom of the filter basin 220 as the intake channel may bend toward the second open end 246. In various embodiments, the angle θ may be greater than 90°, such as, for example, between approximately 110° and 180°. In various embodiments, the size of the opening at the first open end 244 may be larger than the size of the opening at the second open end 246. Thus, the enclosed body 242 of the intake channel 240 may taper from the first open end 244 to the second open end 246. In an embodiment, an outer portion of the second open end 246 of the intake channel 240 may be connected to the bottom of the filter basin 220 to provide support for the intake channel 240.

Figure 3:
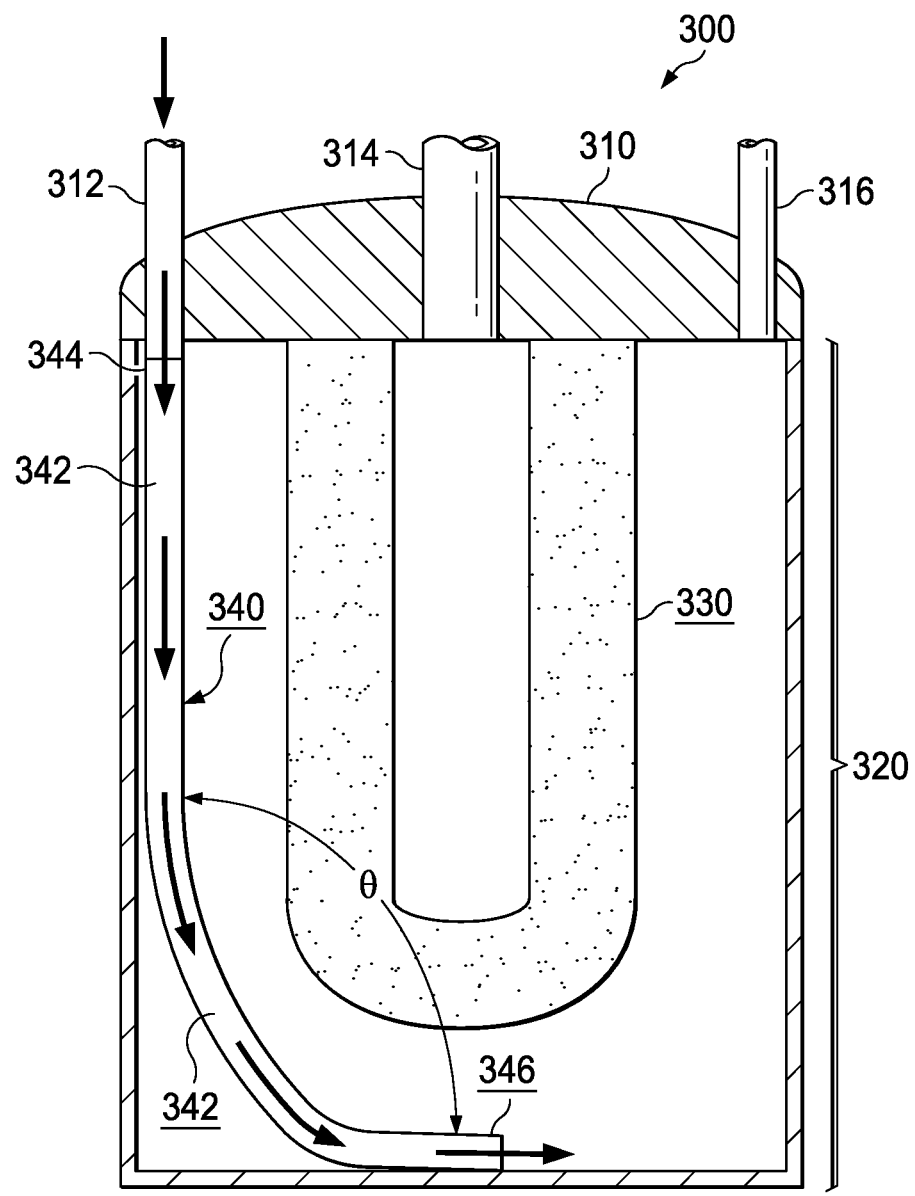

FIG. 3 illustrates a cross-sectional view of another filtering unit 300 according to another embodiment. As illustrated in FIG. 3, the filtering unit 300 may include a filter cap 310, a filter basin 320, a filter 330, and an enclosed fluid intake channel 340. The filter cap 310 may include an inlet port 312, an outlet port 314, and a vent port 316. The filter 330 may be held in place in the filter basin 320 using structural members (not shown) that may be present in the filter cap 310.

The placement, shape, and/or location of the inlet port 312, the outlet port 314 and/or the vent port 316 on the filter cap 310 is provided for illustrative purposes only and is not meant to limit the scope of the present embodiments. Further, the shape of the filter cap 310 and the filter basin 320 as well as the placement and/or shape of the filter 330 is provided for illustrative purposes only and is not meant to limit the scope of the present embodiments. Flow arrows are provided in FIG. 3 to illustrate the flow of a fluid as it may flow into and within the filtering unit 300 and/or the intake channel 340. The fluid may be poured, pumped or injected into the inlet port 312.

As illustrated in FIG. 3, the intake channel 340 may have an enclosed body 342 between a first open end 344 and a second open end 346. The first open end 344 may be coupled to the inlet port 312 such that fluid entering the filtering unit 300 may flow directly into the intake channel 340. Thus, the first open end 344 may be sized to mate with the inlet port 312 to provide an unencumbered direct pathway for the fluid to enter the intake channel 340.

The enclosed body 342 of the intake channel 340 may gradually bend near the filter basin 320 bottom, as shown in FIG. 3, such that the fluid may be dispensed from the second open end 346 of the intake channel 340 at a slight angle or substantially parallel with the filter basin 320 bottom. The gradual bend may be formed an angle θ between the second open end 346 of the intake channel 340 and the enclosed body 342 of the intake channel 340. In various embodiments, the angle θ may be greater than 90°, such as, for example, between approximately 110° and 180°. In various embodiments, the size of the opening at the first open end 344 may be larger than the size of the opening at the second open end 346. Thus, the enclosed body 342 of the intake channel 340 may taper from the first open end 344 to the second open end 346. In an embodiment, an outer portion of the second open end 346 of the intake channel 340 may be connected to the bottom of the filter basin 320 to provide support for the intake channel 340.

Figure 4:
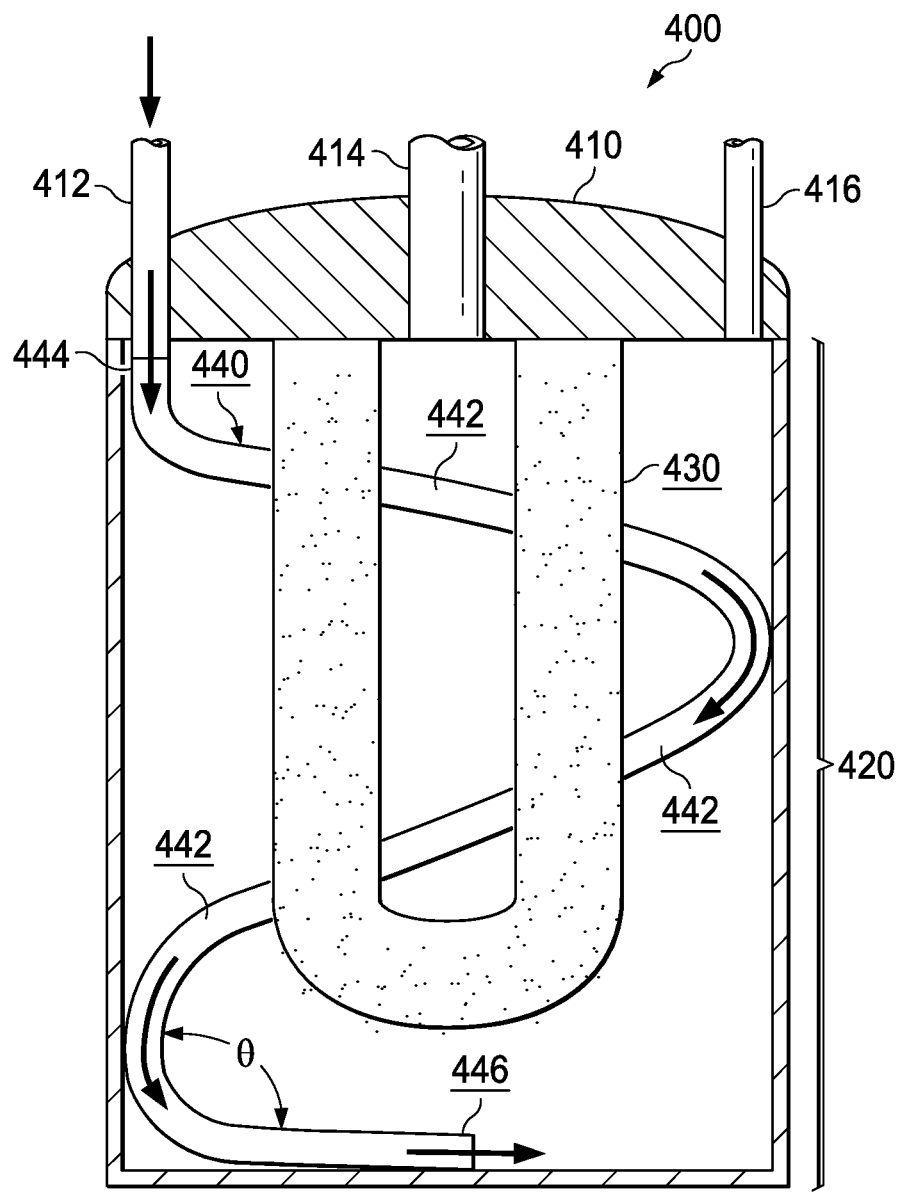

FIG. 4 illustrates a cross-sectional view of another filtering unit 400 according to another embodiment. As illustrated in FIG. 4, the filtering unit 400 may include a filter cap 410, a filter basin 420, a filter 430, and an enclosed fluid intake channel 440. The filter cap 410 may include an inlet port 412, an outlet port 414, and a vent port 416. The filter 430 may be held in place in the filter basin 420 using structural members (not shown) that may be present in the filter cap 410.

The placement, shape, and/or location of the inlet port 412, the outlet port 414 and/or the vent port 416 on the filter cap 410 is provided for illustrative purposes only and is not meant to limit the scope of the present embodiments. Further, the shape of the filter cap 410 and the filter basin 420 as well as the placement and/or shape of the filter 430 is provided for illustrative purposes only and is not meant to limit the scope of the present embodiments. Flow arrows are provided in FIG. 4 to illustrate the flow of a fluid as it may flow into and within the filtering unit 400 and/or the intake channel 440. The fluid may be poured, pumped or injected into the inlet port 412.

As illustrated in FIG. 4, the intake channel 440 may have an enclosed body 442 between a first open end 444 and a second open end 446. The first open end 444 may be coupled to the inlet port 412 such that fluid entering the filtering unit 400 may flow directly into the intake channel 440. Thus, the first open end 444 may be sized to mate with the inlet port 412 to provide an unencumbered direct pathway for the fluid to enter the intake channel 440.

The body 442 of the intake channel 440 may be formed to slope downward along a partial portion of the filter basin 420 perimeter toward the bottom of the filter basin 420. For example, the intake channel 440 may slope downward along one-half or less of the perimeter of the filter basin 420 between a side of the filter basin 420 and the filter 430. As shown in the cross-sectional view of FIG. 4, the intake channel 440 may be formed along the portion of the filter basin 420 perimeter that is behind the filter 430. The intake channel 440 may slope downward toward the bottom of the filter basin 420 in an S-like manner. Near the bottom of the filter basin 420, the enclosed body 442 of the intake channel 440 may gradually bend towards the second open end 446 such that the fluid may be dispensed from the second open end 446 at a slight angle or substantially parallel relative to the bottom of the filter basin 420.

The slope of the intake channel 440 may be greater than approximately 10° and less than 90°. FIG. 4 illustrates an angle θ that may be formed between the second open end 446 of the intake channel 440 and the enclosed body 442 as the intake channel may bend toward the second open end 446. In various embodiments, the angle θ may be greater than 90°, such as, for example, between approximately 110° and 180°. In various embodiments, the size of the opening at the first open end 444 may be larger than the size of the opening at the second open end 446. Thus, the enclosed body 442 of the intake channel 440 may taper from the first open end 444 to the second open end 446. In an embodiment, an outer portion of the second open end 446 of the intake channel 440 may be connected to the bottom of the filter basin 420 to provide support for the intake channel 440.

Figure 5A:
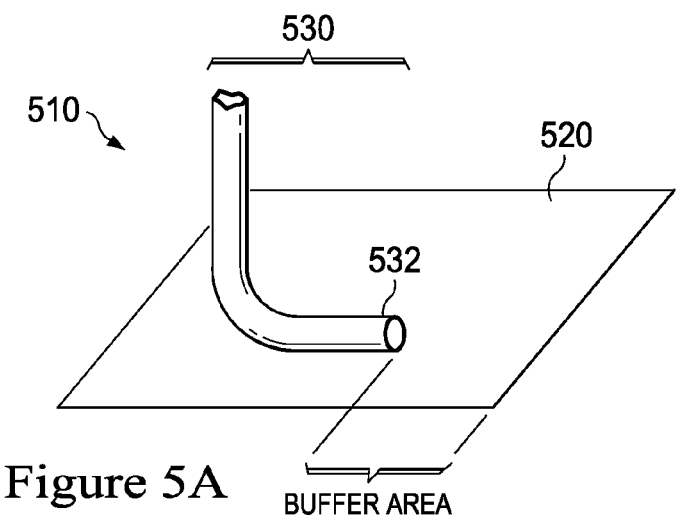
FIGS. 5A-5C illustrate various intake channel configurations according to other embodiments.
Figure 5B:
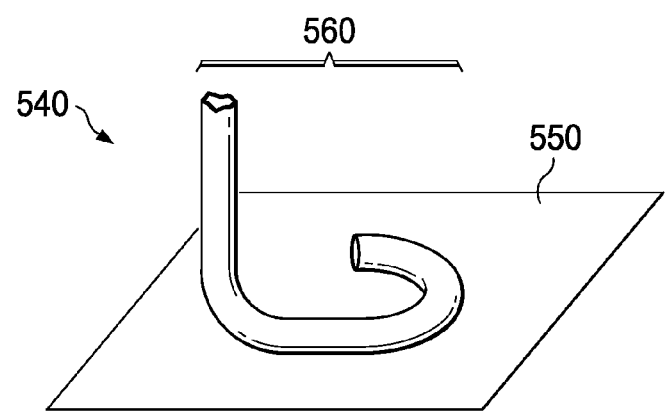
Figure 5C:
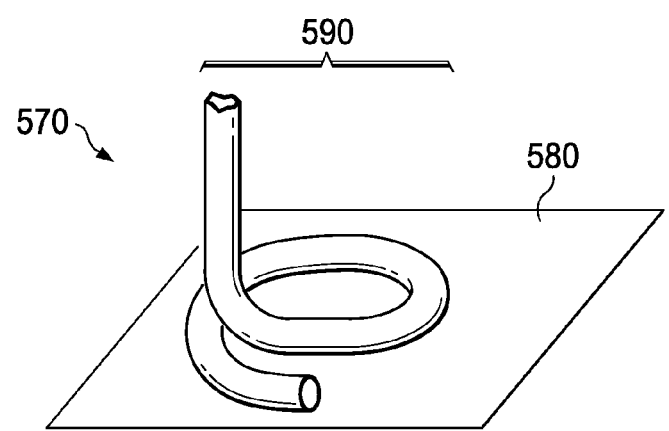

FIGS. 5A-5C illustrate various intake channel configurations according to various embodiments. Sides of a filter basin as well as a filter and filter cap are omitted from FIGS. 5A-5C for illustrative purposes only and are not meant to limit the scope of the present embodiments. FIG. 5A illustrates a straight-line configuration 510 of a portion of an intake channel 530 formed along a filter basin 520 bottom. In various embodiments, the straight-line configuration 510 may extend across approximately 30 to approximately 80% of the bottom of the filter basin provided that a buffer area of at least 20% of the filter basin 520 bottom may lie between an open end 532 of the intake channel and a side (not shown) of the filter basin 520 to minimize bubbles and/or turbulent flow that could be caused if fluid is dispensed into the side of the filter basin 520.

FIG. 5B illustrates an annular configuration 540 of an intake channel 560 along a filter basin 550 bottom. The annular configuration 540 may aid in reducing the flow rate of a fluid within the intake channel 560 before the fluid is dispensed into the filter basin 550. The reduced flow rate may aid in the dispensing of the fluid into the filter basin 550 in a more laminar manner, thus further minimizing bubble formation and/or turbulent flow of the fluid into the filter basin. In a similar manner, as shown in FIG. 5C, a circular configuration 570 of an intake channel 590 may even further reduce the flow rate of a fluid within the intake channel 590 before it may be dispensed into a filter basin 580 as compared to the annular configuration 540 of FIG. 5B.

Figure 6A:
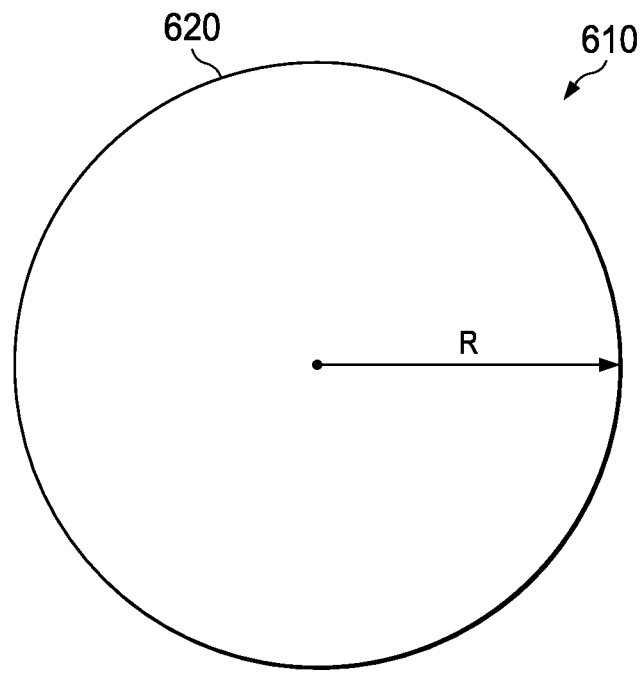
FIGS. 6A-6D illustrate cross-sectional end views of various intake channels according to various embodiments.
Figure 6B:
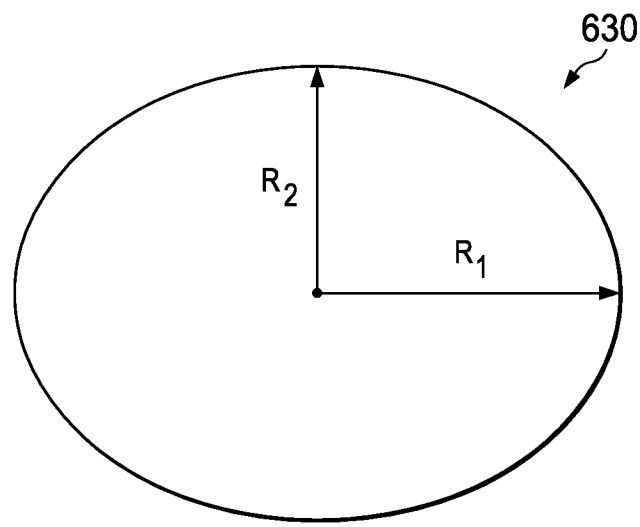

FIG. 6A-6D illustrates cross-sectional end views of various intake channels according to various embodiments. As illustrated in FIGS. 6A-6D the intake channels of the present embodiments may be formed as pipes or tubes, which may channel fluid, in a downward sloping manner, from an inlet port (not shown) to the bottom of a filter basin (not shown). FIG. 6A illustrates a circular cross-section 610 of an intake channel 620. As illustrated in FIG. 6A, the circular intake channel may have a uniform radius R. FIG. 6B illustrates an elliptical cross-section 630 of an intake channel 640. The intake channel 640 may have a radius that may vary between a first, maximum radius $R_1$ and second, minimum radius $R_2$.

Figure 6C:
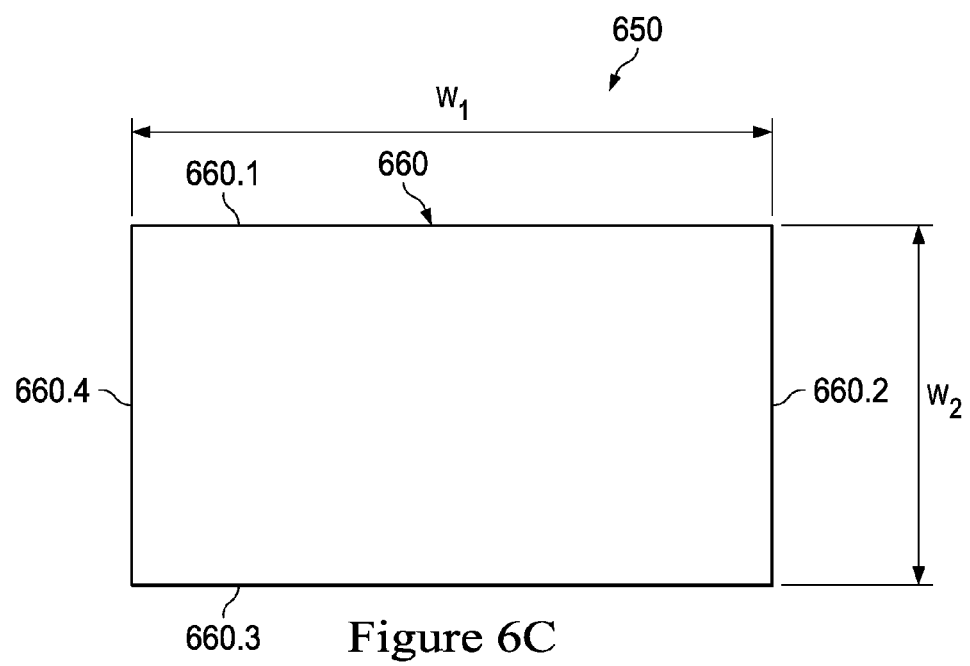

FIG. 6C illustrates a straight-sided cross-section 650 of an intake channel 660. As illustrated in FIG. 6C, the intake channel 660 may include a plurality of straight sides 660.1-660.4. The intake channel 660 may have a first width $W_1$ between a first pair of sides 660.1 and 660.3 and may have a second width $W_2$ between a second pair of sides 660.2 and 660.4. In various embodiments, the first and second widths $W_1$ and $W_2$ may be equal or different.

Figure 6D:
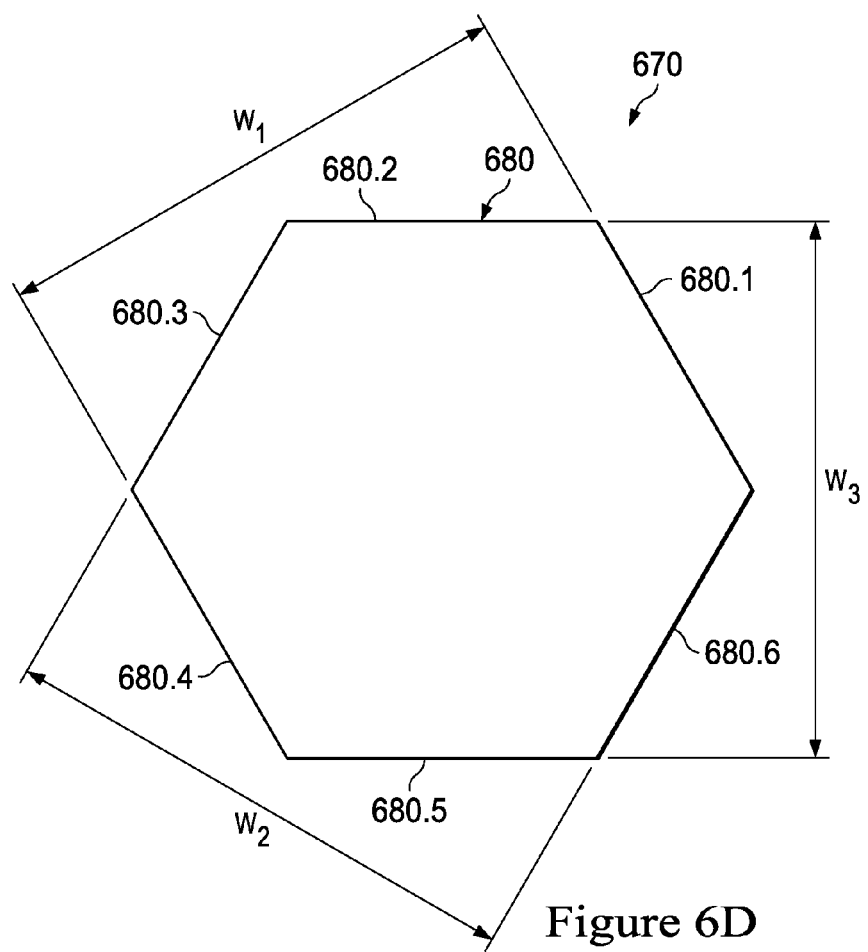

FIG. 6D illustrates another straight sided cross-section 670 of an intake channel 680. As illustrated in FIG. 6D, the intake channel 680 may include a plurality of sides 680.1-680.6. The number of sides of the intake channel 680 is provided for illustrative purposes only and is not meant to limit the number of sides for the intake channel 680. The sides 680.1-680.6 may have same or different lengths. The intake channel 680 may have more or fewer sides than the number of sides shown in FIG. 6D. The intake channel 680 may have a plurality of width $W_1$-$W_3$, each of which may correspond to the distance between any two parallel sides.

Figure 7:
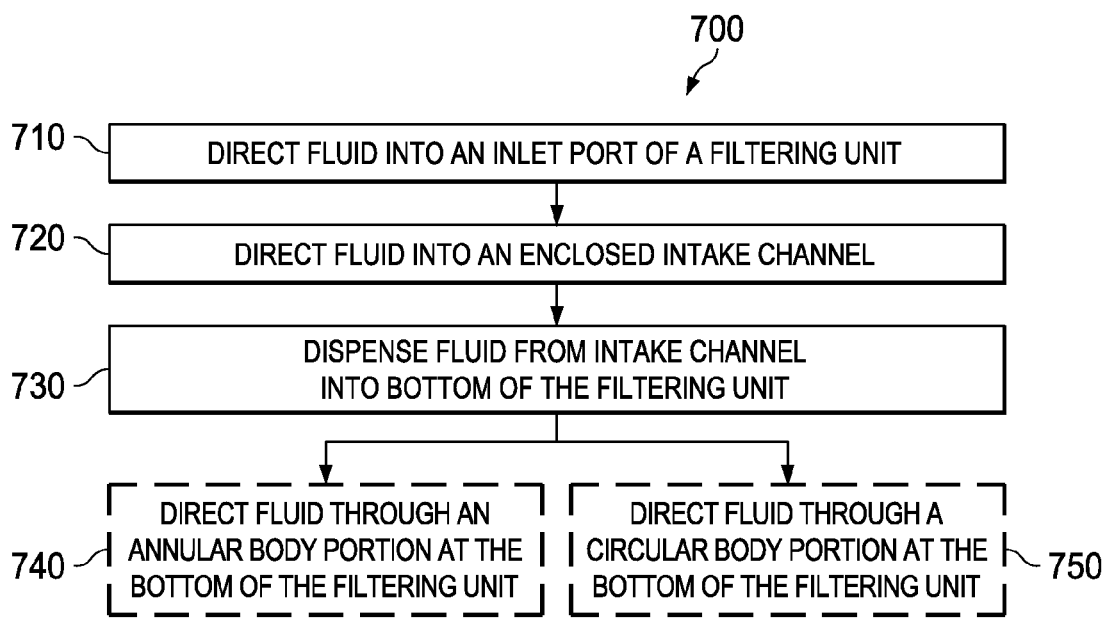
FIG. 7 illustrates a method of directing a fluid through a filtering device according to an embodiment.

FIG. 7 illustrates a method 700 of dispensing fluid into a filtering unit. As illustrated in block 710, the method 700 may direct fluid into an inlet port of the filtering unit. The method 700 may direct the fluid from the inlet port into an enclosed intake channel (block 720). The enclosed intake channel may comprise a body portion that may slope, in a downward manner, to a bottom of the filtering unit. The method 700 may dispense the fluid into the bottom of the filtering unit from an open end of the intake channel (block 730).

In another embodiment, the method 700 may direct the fluid through an annular body portion of the enclosed intake channel before dispensing the fluid from the open end in order to reduce a flow rate of the fluid in the intake channel at the bottom of the filtering unit (block 740). In another embodiment, the method 700 may direct the fluid through a circular body portion of the enclosed intake channel before dispensing the fluid from the open end in order to reduce a flow rate of the fluid at the bottom of the filtering unit (block 750).

In an embodiment, the slope of the body portion of the enclosed intake channel may range from greater than 10° to less than 90°. In another embodiment, the body portion of the enclosed intake channel may bend towards the open end of the intake channel at an angle greater than 110° and less than 180°.

According to embodiments of the present disclosure, a filtering unit may be provided, which may include an enclosed fluid intake channel that may slope from an inlet port towards the bottom of the filtering unit and may dispense the fluid into the bottom of the filtering unit. The flow of the fluid dispensed from the intake channel may be substantially parallel with the bottom of the filtering unit. The fluid dispensed into the filtering unit may flow along the bottom of the filter in an approximately laminar manner, which may reduce bubble formation in the fluid. The reduction of bubbles within the fluid may improve the flow rate and/or filtering efficiency for the filtering unit. The reduction of bubbles within the fluid may also reduce polymer aggregation of the fluid.

In an embodiment, an enclosure is provided. The enclosure may comprise an inlet port and an outlet port; a filter housed within the enclosure; an intake channel having an enclosed body between a first open end and a second open end, the first open end coupled to the inlet port, the second open end being open at a bottom of the enclosure; and wherein the enclosed body of the intake channel slopes to a bottom of the enclosure and a portion of the enclosed body at the bottom of the enclosure is substantially parallel with the bottom of the enclosure.

In another embodiment, an intake channel is provided. The intake channel may comprise a first open end and a second open end, the first open end operatively coupled to a first port of a filtering unit, wherein the coupling provides direct path between the first port and the first end; an enclosed body between the first open end and the second open end, wherein the enclosed body slopes downward to a bottom of the filtering unit and wherein a portion of the enclosed body at the bottom of the filtering unit is substantially parallel with the bottom of the filtering unit.

In another embodiment, a method is provided. The method may comprise directing fluid into an inlet port of the filtering unit; directing the fluid from the inlet port into an enclosed intake channel, wherein the enclosed intake channel comprises a body portion that slopes in a downward manner to a bottom of the filtering unit; and dispensing the fluid into the bottom of the filtering unit in a laminar manner, wherein the fluid flows from an open end of the enclosed intake channel.

Although the present embodiments and their advantages have been described in detail, it should be understood that various changes, substitutions and alterations can be made herein without departing from the spirit and scope of the disclosure as defined by the appended claims. For example, it will be readily understood by those skilled in the art that the structures and ordering of steps as described above may be varied while remaining within the scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An enclosure, comprising:
   an inlet port, an outlet port, and a vent port;
   a filter housed within the enclosure; and
   an intake channel having a first open end, an enclosed body, and a second open end, the enclosed body extending between the first open end and the second open end, the first open end coupled to the inlet port, and the second open end being open to an interior region of the enclosure at a bottom of the enclosure and operatively uncoupled from the filter;

wherein the enclosed body of the intake channel slopes to the bottom of the enclosure in a spiral manner between a sidewall of the enclosure and the filter, and a portion of the enclosed body at the bottom of the enclosure is substantially parallel with the bottom of the enclosure.

2. The enclosure of claim 1, wherein the enclosed body of the intake channel slopes to the bottom of the enclosure along an entire perimeter of the enclosure.

3. The enclosure of claim 1, wherein the enclosed body of the intake channel slopes to the bottom of the enclosure along a portion of a perimeter of the enclosure, wherein the portion represents less than one-half of the perimeter of the enclosure.

4. The enclosure of claim 1, wherein a slope of the enclosed body of the intake channel ranges from greater than 10° to less than 90°.

5. The enclosure of claim 1, wherein the enclosed body of the intake channel is bent towards the second open end of the intake channel at an angle greater than or equal to 110° and less than or equal to 180°.

6. The enclosure of claim 1, wherein the intake channel forms an annular shape along the bottom of the enclosure.

7. The enclosure of claim 1, wherein the intake channel forms a circular shape along the bottom of the enclosure.

8. The enclosure of claim 1, wherein an outer surface of the portion of the enclosed body at the bottom of the enclosure is connected to the enclosure.

9. An intake channel, comprising:
a first open end, the first open end operatively coupled to a first port of a filtering unit, wherein the coupling provides a direct path between the first port and the first open end;
a second open end, wherein the intake channel slopes downward in a spiraling manner between a side of the filtering unit and a filter within the filtering unit from the first open end of the intake channel to the second open end of the intake channel, and wherein the second open end is operatively uncoupled from the filter; and
an enclosed body between the first open end and the second open end, wherein a portion of the enclosed body at a bottom of the filtering unit is substantially parallel with the bottom of the filtering unit, wherein the intake channel is configured to pass a fluid from the first open end to the second open end, and wherein the second open end is configured to release the fluid into an interior region of the filtering unit.

10. The intake channel of claim 9, wherein a slope of the enclosed body of the intake channel ranges from greater than 10° to less than 90°.

11. The intake channel of claim 9, wherein the enclosed body of the intake channel is bent towards the second open end of the intake channel at an angle greater than or equal to 110° and less than or equal to 180°.

12. The intake channel of claim 9, wherein a cross-section of the intake channel has a plurality of straight sides and a plurality of widths, wherein each width corresponds to a distance between a pair of respective sides.

13. The intake channel of claim 9, wherein a cross-section of the intake channel is elliptical and having a varying radius that varies between a maximum radius and a minimum radius.

14. The intake channel of claim 9, wherein the intake channel slopes downward in the spiraling manner between the side of the filtering unit and the filter within the filtering unit along a full perimeter of the filtering unit from the first open end of the intake channel to the second open end of the intake channel such that the intake channel surrounds the filter within the filtering unit.

15. A filtering unit comprising:
a filter basin configured to be filled with a fluid;
a fluid intake channel disposed in the filter basin and extending from a top of the filter basin to a bottom of the filter basin, the fluid intake channel having a first open end at the top of the filter basin and a second open end at the bottom of the filter basin, the first open end and the second open end connected by an enclosed body, and the second open end being substantially perpendicular to the first open end, and the fluid intake channel having a sloped portion and an outlet, wherein the sloped portion has a slope ranging from greater than 10° to less than 90°, and wherein the outlet forms an angle relative the sloped portion greater than or equal to 110° and less than or equal to 180°;
a filter cap comprising:
an inlet port operatively coupled to the first open end of the fluid intake channel and configured to receive the fluid from a source;
an outlet port configured to release the fluid from the filter basin; and
a vent port configured to vent excess gas from the filter basin; and
a filter disposed within the filter basin.

16. The filter unit of claim 15, wherein a portion of the enclosed body at the bottom of the filter basin is substantially parallel with the bottom of the filter basin.

17. The filter unit of claim 15, wherein the second open end of the fluid intake channel is beneath a central region of the filter.

18. The filter unit of claim 15, wherein an outer surface of a portion of the enclosed body at the bottom of the filter basin is connected to the filter basin.

19. The filter unit of claim 15, wherein the enclosed body slopes to the bottom of the filter basin in a spiral manner between a sidewall of the filter basin and the filter.

20. The filter unit of claim 15, wherein the enclosed body surrounds the filter.

* * * * *